United States Patent
Maeda et al.

(10) Patent No.: US 6,521,721 B1
(45) Date of Patent: Feb. 18, 2003

(54) POLYMER PRODUCTION PROCESS

(75) Inventors: Yoshihiro Maeda, Toride (JP); Shigeru Yamaguchi, Yao (JP); Shorbu Shioji, Himeji (JP); Kaoru Iwasaki, Ibo-gun (JP)

(73) Assignee: Nippon Shokubai Co., Ltd, Osaka (JP)

( * ) Notice: Subject to any disclaimer, the term of this patent is extended or adjusted under 35 U.S.C. 154(b) by 238 days.

(21) Appl. No.: 09/688,003

(22) Filed: Oct. 14, 2000

(30) Foreign Application Priority Data

Oct. 28, 1999 (JP) .......................................... 11-307779

(51) Int. Cl.⁷ .................................................. C08F 2/00
(52) U.S. Cl. .............................. 526/68; 526/67; 526/70; 526/317.1; 526/318.2
(58) Field of Search .............................. 526/67, 68, 70, 526/317.1, 318.2

(56) References Cited

U.S. PATENT DOCUMENTS 5,306,790 A * 4/1994 Imbayashi et al. ............ 526/68

FOREIGN PATENT DOCUMENTS

| JP | 62-270605 A | 11/1987 |
|----|----|----|
| JP | 3-2167 B2 | 1/1991 |
| JP | 3-14046 B2 | 2/1991 |
| JP | 5-239114 A | 9/1993 |
| JP | 5-247143 A | 9/1993 |
| JP | 2574144 B2 | 10/1996 |
| JP | 10-158310 A | 6/1998 |

\* cited by examiner

Primary Examiner—Fred Teskin
(74) Attorney, Agent, or Firm—Haugen Law Firm PLLP

(57) ABSTRACT

The present invention provides: a production process that enables to keep foaming state within a constant level and to obtain a polymer with good productivity and reproducibility with a practical plant by defining an appropriate vapor velocity from a weight-average molecular weight of the polymer that is finally intended to obtain; and a polymerization apparatus therefor. A production apparatus for producing a polymer, which comprises a reactor 1 in order to produce the polymer, a stirrer 2 in order to stir a reaction solution in the reactor 1, and a condenser 3 so that a vaporized reaction solution can be cooled and returned to the reactor 1, and further comprises a vapor velocity measuring means of monitoring a vapor velocity in the condenser, and an vapor velocity adjusting means of adjusting the vapor velocity, is used. Then, the vapor velocity is adjusted in the range of 0.001 to 0.05 m/s so that a common logarithm value of a weight-average molecular weight of the polymer that is finally intended to obtain multiplied by the value of the vapor velocity can be not more than 0.15 for not less than 10% of the whole reaction time.

1 Claim, 1 Drawing Sheet

POLYMER PRODUCTION PROCESS

BACKGROUND OF THE INVENTION

A. Technical Field

The present invention relates to: a production process for a polymer, particularly, a production process preferably applied to the production of a water-soluble polymer; and a production apparatus therefor.

B. Background Art

Polymers such as a water-soluble polymer, particularly, acrylic acid polymer having many carboxylic groups, maleic acid polymers copolymers thereof, and these polymers into which a sulfonic group or a hydroxyl group was further introduced, are well-known to be able to display superior calcium-ion-binding capability and clay-dispersing functions, and superior anti-gelation capability. Therefore, these polymers are used in the very wide range, for example, for inorganic pigment dispersants, scale inhibitors, chelating agents, detergent compositions, fiber-treating agents, wood pulp-bleaching assistants.

Many studies and developments as to production processes for these polymer have been carried out up to this day, and are disclosed in, for example, JP-A-270605/1987, JP-A-239114/1993, JP-A-247143/1993, JP-B-2167/1991, JP-B-14046/1991 and Japanese Patent No. 2574144.

These prior studies and developments aimed at, for example, adjusting components and molecular weight, and decreasing the amount of residual monomer in order to making the best use of characteristics of the water-soluble polymers and so on, and to answer the above various use.

However a scale-up problem as to production processes for these polymers has not been considered up to this day. When a production process having 100 g to about 5 kg scale in the stage of a laboratory is turned into a practical plant having very large 1 to 30 t scale, it is inevitable to solve a problem of removing heat. In general, it is said that: the larger scale a production process is, the worse an ability for removing heat becomes like an exponential decrease from the relationship between surface area and volume of a polymerization reactor.

In view of safety and economy, it is general to produce a polymer in an aqueous solvent and at a high temperature, if possible, at a temperature in the vicinity of the boiling point. Therefore, decrease of ability for removing heat results in foaming extremely, namely, extremely boiling state, and losing stirring effect. At last, a problem that the reaction solution overflows the polymerization reactor and the polymerization itself cannot be continued, is caused. In recent years, a concentration of raw materials tends to rise in view of improving productive efficiency, still more, the decrease has resulted in foaming extremely, namely, extremely boiling state easily.

In order to suppress such as foaming and boiling phenomenon, a condenser so that a vaporized reaction solution by boiling can be cooled and returned to the reactor, is placed generally as a portion of a production apparatus. However if a foaming state becomes violent beyond cooling ability of the condenser, a reflux amount, namely, a vapor velocity becomes very large, the foaming cannot be suppressed, the polymerization itself cannot be continued, and decrease of productivity such as attaching gel in the polymerization reactor is caused. In addition, a problem that a distribution of a weight molecular weight of the obtained polymer becomes broad, is caused. On the other hand, if heat quantity of the polymerization reactor is lacking, it is difficult to arise foaming and boiling phenomenon. However if the vapor velocity is too low, a problem that a distribution of a weight molecular weight of the obtained polymer becomes broad and reproducibility of the obtained polymer becomes much lower, is caused.

The problem like this can be solved by prospecting foaming state at producing the polymer beforehand precisely, and adjusting cooling ability of the condenser and heating condition of the polymerization reactor. However it is difficult to prospect the foaming state at producing the polymer beforehand precisely because the state is different owing to various conditions such as polymerization system and the polymerization reactor.

SUMMARY OF THE INVENTION

A. Object of the Invention

An object of the present invention is to provide: a production process that enables to keep foaming state within a constant level and to obtain a polymer with good productivity and reproducibility with a practical plant by defining an appropriate vapor velocity from a weight-average molecular weight of the polymer that is finally intended to obtain; and a polymerization apparatus therefor.

B. Disclosure of the Invention

The present inventors diligently studied to solve problems of foaming that is caused when producing a polymer with a level of the practical plant and in a high concentration and a short time. As a result, they hit on an idea that: foaming state can be kept within a constant level and physical properties of the obtained polymer can be controlled by defining precisely an appropriate vapor velocity allowed for a weight-average molecular weight of the polymer that is intended to obtain, and completed the present invention.

Accordingly, a production process for a polymer, according to the present invention, comprises the steps of: refluxing and cooling a vapor generated in a reaction, and returning the vapor to the reaction system in order to produce the polymer, wherein the vapor velocity is adjusted in the range of 0.001 to 0.05 m/s so that a common logarithm value of a weight-average molecular weight of the polymer that is finally intended to obtain multiplied by the value of the vapor velocity can be not more than 0.15 for not less than 10% of the whole reaction time.

In addition, a production apparatus for producing a polymer, according to the present invention, comprises a reactor in order to produce the polymer, a stirrer in order to stir a reaction solution in the reactor, and a condenser so that a vaporized reaction solution can be cooled and returned to the reactor, with the production apparatus further comprising a vapor velocity measuring means of monitoring a vapor velocity in the condenser, and an vapor velocity adjusting means of adjusting the vapor velocity.

These and other objects and the advantages of the present invention will be more fully apparent from the following detailed disclosure.

Figure 1:
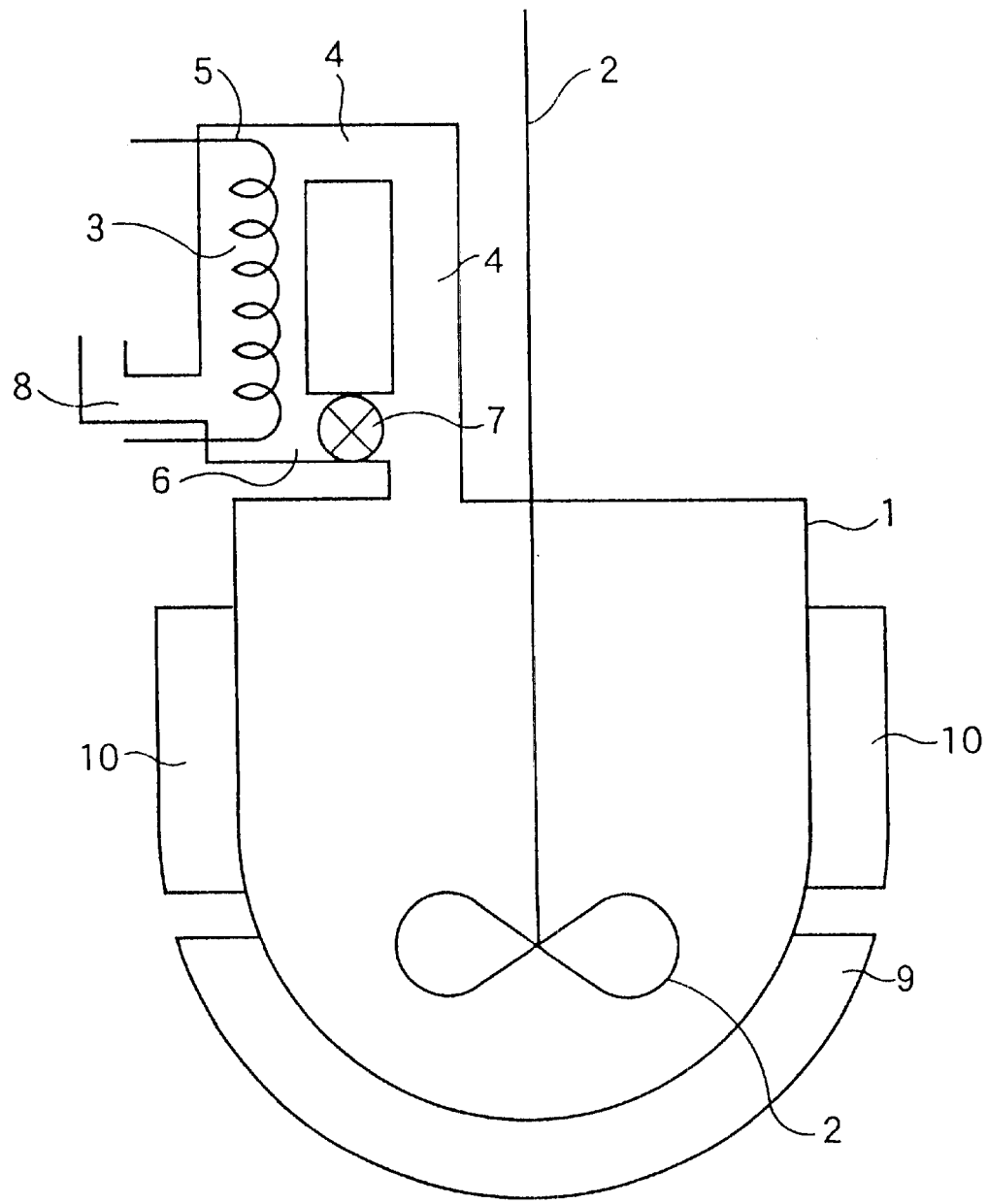
FIG. 1 is one example for a rough cross section view of the production apparatus for a polymer according to the present invention.

(Explanation of the Symbols):
1: Reactor, 2: Stirrer, 3: Condenser, 4, 6: Flow path, 5: Cooling coil, 7: Flowmeter, 8: Vent line, 9: Lower jacket, and 10: Upper jacket.

DETAILED DESCRIPTION OF THE INVENTION

Hereinafter, an example of a production process for a water-soluble polymer is illustrated as a preferred mode for carrying out the present invention. Each requisite which the present invention comprises is divided into every item and explained in detail.

Adjustment of a Vapor Velocity

<Vapor Velocity>

In the present invention, a vapor velocity is a value: a reflux amount per a second when a vaporized reaction solution is refluxed, cooled and returned to a reaction system, divided by a cross section area of a reactor in a vapor-liquid surface of the reaction solution at the time. That is to say, the value is calculated by a following formula.

$$\text{Vapor velocity } (m/s) = a\ (m^3)/b\ (m^2)$$

a: a reflux amount from a condenser b: a cross section area of a reactor in a vapor-liquid surface of the reaction solution in a unstirred state at the time.

Furthermore, a reflux amount from a condenser (a) can be estimated with a flowmeter placed in a returning flow pass from the condenser to the reactor. In this way, the vapor velocity can be monitored at all times during the reaction.

In the present invention, it is important to adjust a vapor velocity is adjusted in the range of 0.001 to 0.05 m/s, preferably 0.001 to 0.04 m/s, more preferably 0.001 to 0.035 m/s, so that a common logarithm value of a weight-average molecular weight of the polymer that is finally intended to obtain multiplied by the value of the vapor velocity can be not more than 0.15, preferably not more than 0.12. In case where the vapor velocity is slower than 0.001 m/s, a refluxing state is not obtained substantially and polymerization is carried out at a temperature not more than boiling point. Therefore, the amount of residual monomer increases and productivity decreases, it becomes difficult to carry out temperature control, and a problem that reproducibility of the obtained polymer becomes lower, is caused. On the other hand, in case where the vapor velocity is faster than 0.05 m/s, there is a fear that foaming becomes beyond limitation and it becomes impossible to polymerize any more. In addition, in case where the common logarithm value of a weight-average molecular weight of the polymer that is intended to obtain multiplied by the value of the vapor velocity becomes more than 0.15, there is a fear that foaming becomes extreme and polymerization cannot be continued.

<Time Maintaining Vapor Velocity>

In the present invention, the vapor velocity has to be adjusted to the above-mentioned value for not less than 10% of the whole reaction time. The above-mentioned value may be controlled preferably for not less than 50% of the whole reaction time, more preferably for not less than 80%, most preferably at all times for the whole reaction time. In case where the vapor velocity is adjusted to the above-mentioned value for less than 10% of the whole reaction time, effect to foaming within a constant level cannot be displayed substantially.

<Method for Adjusting Vapor velocity>

In the present invention, methods for adjusting the vapor velocity are not especially limited, but usually a method for adjusting the vapor velocity comprising: cooling the reactor by letting cooling water flow into a jacket at a side portion of the reactor if the vapor velocity is too fast, or heating the reactor by letting steam flow into the jacket if the vapor velocity is too slow is generally adopted. In addition to this method, a method comprising: placing a cooling jacket around the condenser in order to raise cooling ability of the condenser if necessary, a method comprising: adjusting temperature of a solution to be dropped into the reaction system, a method comprising: adjusting dropping time of the solution in order to adjust reaction rate, and so on can be used at the same time.

Producing a Polymer

Kinds of a polymer obtained according to the production process of the present invention are not especially limited, but the kind thereof is a water-soluble polymer preferably because effect of the present invention is the most excellent. Particularly, acrylic acid polymer having many carboxylic groups, maleic acid polymers copolymers thereof, and these polymers into which a sulfonic group or a hydroxyl group was further introduced, are more preferable.

Hereinafter, an example of a production process for a water-soluble polymer is illustrated and the production process according to the present invention is explained.

<Monomer Component>

Hereinafter, examples of a monomer as a raw material of the polymer are shown.

(1) Acrylic Acid Polymer Having a Carboxylic Group

Examples thereof include monoethylenically unsaturated monocarboxylic acid monomers such as acrylic acid, methacrylic acid, crotonic acid and α-hydroxyacrylic acid; unsaturated polycarboxylic acid monomers, such as itaconic acid, mesaconic acid, fumaric acid and citraconic acid; and any salt or anhydride thereof.

Hereupon, examples of salts include alkali metal salts such as sodium salts and potassium salts; alkali earth metal salts such as calcium salts and magnesium salts; organic amine salts such as ammonium salts, monoethanolamine salts and triethanolamine salts. These salts can be used alone or at the same time. Hereinafter, these salts can be mentioned simply as salts.

(2) Monomers Including a Sulfonic Group

Examples thereof include monoethylenically unsaturated monosulfonic acid monomers such as 3-allyloxy-2-hydroxypropanesulfonic acid, vinylsulfonic acid, allylsulfonic acid, methallylsulfonic acid, styrenesulfonic acid, 2-acrylamido-2-methylpropanesulfonic acid, sulfoethyl (meth)acrylate, sulfopropyl (meth)acrylate and 2-hydroxy-3-butenesulfonic acid.

(3) Monomers Including a Hydroxyl Group

Examples thereof include monoethylenically unsaturated hydroxyl group containing monomers such as 3-methyl-2-buten-1-ol (prenol), 3-methyl-3-buten-1-ol (isoprenol), 2-methyl-3-buten-2-ol (isoprene alcohol), 2-hydroxylethyl (meth)acrylate, polyethylene glycol mono(meth)acrylate, polypropylene glycol mono(meth)acrylate, polyethylene glycol monoisoprenol ether,and vinyl alcohol.

(4) Other Monomers

Examples thereof include amide monomers such as (meth)acrylamide and t-butyl (meth)acrylamide; cationic monomers such as dimethylaminoethyl (meth)acrylate and dimethylaminopropyl (meth)acrylate; and phosphorus containing monomers such as (meth)acrylamide methanephosphonic acid.

These monomers (1) to (4) can be used alone or at the same time. If copolymers are obtained, hydrophobic monomers such as vinyl acetate and (meth)acrylic acid esters are used at the same time if necessary within an amount that does not spoil water solubility of the obtained polymer.

If the water-soluble polymer is used for inorganic pigment dispersants, scale inhibitors, chelating agents, detergent compositions, fiber-treating agents, wood pulp-bleaching assistants with making the best use of characteristics thereof, other monomers is mixed according to each purpose for use.

(a) Monomer (1) is used preferably in the range of not less than 50 mol %, more preferably not less than 80 mol %, most preferably 100 mol %. Among monomers (1), (meth)acrylic acid (salt), maleic acid (salt) and anhydride thereof is especially preferably. In a copolymer of (meth)acrylic acid (salt)/maleic acid (salt), the molar ratio of both monomers is preferably in the range of 40/60 to 60/to 40.

(b) The combination comprises not less than 50 mol % of monomer (1) and not more than 30 mol % of monomer (2). The sum of monomers (1) and (2) is preferably in the range of not less than 80 mol %, more preferably 100 mol %. Hereupon, (meth)acrylic acid, maleic acid and anhydride thereof is especially preferably among monomers (1), and 3-allyloxy-2-hydroxypropanesulfonic acid (salt), 2-acrylamido-2-methylpropanesulfonic acid (salt) and sulfoethyl (meth)acrylate (salt) is especially preferably among monomers (2).

<Solvent>

Organic solvents can be used as a solvent, but water, especially fresh water is more preferable. If water is used, an organic solvent within an amount that does not have a harmful influence on polymerization may be added to water appropriately.

Examples of the organic solvent include lower alcohols such as methanol, ethanol and isopropyl alcohol; lower ketones such as acetone, methyl ethyl ketone and diethyl ketone; ethers such as dimethyl ether, diethyl ether and dioxane; and amides such as dimethylformamide. These can be used alone or at the same time.

<Polymerization Initiator>

A polymerization initiator is not especially limited, but a radical polymerization initiator is used preferably. Hydrogen peroxide, a persulfuric acid salt, and both at the same time are used more preferably. According to circumstances, polyvalent metal ions are used as a decomposition accelerator of a chain transfer agent and the initiator.

Examples of the radical polymerization initiator include: persulfuric acid salts such as ammonium persulfate, potassium persulfate and sodium persulfate; azo compounds such as 2,2'-azobis(2-amidinopropane) dihydrochloride, 4,4'-azobis-(4-cyanovaleric acid), azobisisobutyronitrile and 2,2'-a zobis(4-methoxy-2 ,4-dimethylvaleronitrile); organic peroxides such as benzoyl peroxide, lauroyl peroxide, peracetic acid, persuccinic acid, di-tertiary-butyl peroxide and cumene hydroperoxide; and hydrogen peroxide. Among these, the persulfuric acid salts such as ammonium persulfate, potassium persulfate and sodium persulfate are preferable. These are used alone or at the same time.

The amount of the radical polymerization initiator, as used, is preferably within the range of 0.1 to 10 g, more preferably 1 to 8 g, per mol of the monomer. In the case where the amount, as used, is smaller than 0.1 g, there are disadvantages in that the amount of residual monomer tends to increase very much. In the case where more than 10 g of the initiator is used, there are disadvantages in economy on the contrary because an addition effect of the initiator is not improved very much. It may safely be said that: the more the amount of the initiator is, the lower the substantial amount of the obtained polymer becomes.

A method for adding the radical polymerization initiator is not especially limited, but adding dropwise is preferable. Considering decomposition character and so on, the amount added substantially continuously is preferable in the range of not less than 50 weight % of the whole used amount, more preferably not less than 80 weight %, and most preferably 100 weight %.

When using an initiator such as hydrogen peroxide, that decomposes comparatively slow, in conditions of polymerization temperature and polymerization pH below, completion of adding the initiator finishes preferably earlier than completion of adding the monomer by ten minutes or more, more preferably by twenty minutes or more. In case where the completion of adding the initiator finishes within ten minutes after the completion of adding the monomer, a harmful influence is not given to the reaction itself. However, the added initiator remains at the end of the polymerization in vain, and there is also a fear that the residual initiator have a harmful influence on thermal stability of the obtained polymer.

On the other hand, when using an initiator such as ammonium persulfate, potassium persulfate and sodium persulfate, that decomposes comparatively fast, completion of adding the initiator finishes preferably by completion of adding the monomer, more preferably later than completion of adding the monomer by five minutes or more because the amount of residual monomer in the obtained water-soluble polymer can be decreased. In case where the completion of adding the initiator finishes before the completion of adding the monomer, a harmful influence is not given to the polymerization reaction. However, there are problems in that the monomer remains.

An addition of the initiator can begin appropriately, for example, before beginning of adding the monomer. If two initiators are used, after addition of one initiator begins, and after a definite time passes or after completion of adding the initiator, addition of another initiator may begin. In short, the addition of the initiator can be settled appropriately according to decomposition rate of the initiator and reactivity of the monomer.

<Chain Transfer Agent>

In the present invention, a chain transfer agent within an amount that does not have a harmful influence on polymerization reaction can be used at the same time. Examples of the chain transfer agent include sulfite salts, bisulfite salts and hypophosphite, but are not especially limited. These can be used alone or at the same time.

An amount of the chain transfer agent as used is preferably within twice of an amount of the initiator by weight. In case where the chain transfer agent is used more than twice, it is unpreferable that addition effect is not caused any longer and substantial amount of the obtained polymer becomes lower.

The chain transfer agent is added into the reaction system by method such as adding dropwise. Addition time thereof is not especially limited, but can be settled appropriately.

<Polyvalent Metal Ion>

Responding necessity such as improving decomposition of the radical polymerization initiator, polyvalent metal ions can be used with the radical polymerization initiator at the same time. Examples of effective polyvalent metal ions include: $Fe^{3+}$, $Fe^{2+}$, $Cu^+$, $Cu^{2+}$, $V^{2+}$, $V^{3+}$ and $VO^{2+}$. These can be used alone or at the same time.

A method for adding the polyvalent metal ions is not especially limited, but charging the whole amount thereof before initiation of the reaction is preferable.

An amount of the polyvalent metal ions as used is preferably in the range of not more than 100 ppm in the entirety of the reaction solution. In case where the amount is used higher than 100 ppm, the obtained water-soluble polymer is highly colored, and it might therefore be impossible to use such a polymer according to its use.

The form in which the polyvalent metal ions are supplied is not especially limited, and any metal compound and any metal can be used if it becomes ionized in the polymerization reaction system. Examples of such metal compounds and metals include: water-soluble metal salts, such as vanadium oxytrichloride, vanadium trichloride, vanadium oxalate, vanadium sulfate, vanadic anhydride, ammonium metavanadate, ammonium hypo-vanadious [$(NH_4)_2SO_4 \cdot VSO_4 \cdot 6H_2O$], ammonium vanadious [$(NH_4)V(SO_4)_2 \cdot 12H_2O$], copper(II) acetate, copper(II), copper(II) bromide, acetylacetate, cupric chloride, ammonium cuprous chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper (I) cyanide, copper iodide, copper(I) oxide, copper thiocyanate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate and ferric pyrophosphate; metal oxides, such as vanadium pentaoxide, copper(II) oxide, ferrous oxide and ferric oxide; metal sulfides, such as copper(II) sulfide and iron sulfide; and copper powder and iron powder.

<Polymerization Method>

Examples of the polymerization method include kneading polymerization and stirring polymerization in view of apparatuses, and solution polymerization, suspension polymerization and emulsion polymerization in view of methodology, but are not especially limited. In particular, stirring solution polymerization is preferable in order to control the vapor velocity efficiently in the present invention. In addition, examples of solution polymerization include solvent polymerization and aqueous polymerization in view of kinds of solvent as used, but aqueous polymerization is preferable because of safety. Therefore, the most preferable polymerization method in the present invention is stirring aqueous solution polymerization.

Hereinafter, the stirring aqueous solution polymerization is explained in detail.

As to the unsaturated dicarboxylic acid monomer, preferably 50 wt % or more, more preferably 80 wt % or more, most preferably the entirety, of the amount thereof as used is charged initially. In the case where the initial charging amount is smaller than 50 wt %, there are disadvantages in that a large amount of unreacted materials might remain.

As to the unsaturated monocarboxylic acid monomer, preferably 70 wt % or more, more preferably 90 wt % or more, most preferably the entirety, of the amount thereof as used is substantially continuously dropwise supplied into the reaction system. In the case where the amount is less than 70 wt % (namely, the charging amount prior to the reaction is 30 wt % or more), the monomer is polymerized into very high molecular weight. In addition, in case of copolymerization, there are disadvantages in that the monomer blockily polymerizes at the beginning of the polymerization.

A period for adding the monomer is appropriately settled in consideration of polymerizability of the monomer, but is preferably in the range of 30 to 240 minutes and more preferably 60 to 180 minutes. In case where the period is shorter than 30 minutes, an addition amount of the monomer in a unit time becomes larger and the monomer concentration becomes higher. Then, a polymer having very high molecular weight is formed. In addition, in case of copolymerization, there is a fear that the monomer polymerizes blockily. In case where the period is longer than 240 minutes, productivity thereof falls extremely and it is a disadvantage in economy.

<PH in the Course of Polymerization>

PH in the course of the polymerization is not especially limited, but in case of using the unsaturated dicarboxylic acid monomer, it is preferable hereinafter.

In case of using the unsaturated dicarboxylic acid monomer, as is mentioned above, 50 wt % or more of the amount thereof as used is charged initially. Then, pH at time of completion of initial charging (at a time just before beginning addition or at a time just before beginning polymerization) is in the range of 5 to 13, preferably 5 to 12. Thereafter, it is preferable that: the polymerization begins by starting to add other additives (other monomer, initiator and pH adjusting agent, and so on), and pH is settled to decrease gradually as the polymerization is advanced. It is preferable that pH at time of addition completion is adjusted in the range of 4 to 8. The reasons are shown hereinafter.

In general, a large amount of the unsaturated dicarboxylic acid monomer is added in a step of initial charging because the unsaturated dicarboxylic acid monomer is less polymerizable, for example, than the unsaturated monocarboxylic acid monomer. Therefore, it is a fear that concentration of the unsaturated dicarboxylic acid monomer is very high at the beginning of the polymerization and the monomer blockily polymerizes. Then, it is necessary to control polymerizability of this dicarboxylic acid monomer. As to dicarboxylic acid monomer, there three type monomers: both carboxylic groups are acids; one carboxylic group is a acid (semi-neutralized type); and both carboxylic acids are neutralized. Among these, semi-neutralized type monomers are known to be most reactive. Therefore, the reactivity of the dicarboxylic acid monomer can be controlled by controlling amount of this semi-neutralized type. That is to say, polymerizability of the dicarboxylic acid monomer is controlled to a certain extent by limiting existing amount thereof to a certain extent and concentration of the dicarboxylic acid monomer becomes decreased as the polymerization is advanced. Therefore, it is necessary to increase existing amount of semi-neutralized type because polymerizability is also decreased. The above-mentioned settlement of pH is carried out in accordance with these matters.

Examples of pH adjusting agent include alkaline metal hydroxides such as sodium hydroxide and potassium hydroxide; alkaline earth metal hydroxides such as calcium hydroxide and magnesium hydroxide; and organic amine salts such as ammonia, monoethanolamine and triethanolamine. These may be used either alone respectively or in combinations with each other. Among these, preferable ones are alkaline metal salts such as sodium hydroxide and potassium hydroxide, and the most preferable one is sodium hydroxide. In the present specification, these are just referred to "pH adjusting agent" or "neutralizer".

<Polymerization Temperature>

From time of beginning polymerization (time of beginning addition) to time of completion of polymerization (time of completion of adding all the monomers, or in case of settle maturing time, time of completion of the maturing time), polymerization temperature is boiling point of the reaction solution for 10% or more at least, preferably 50% or more, more preferably 80% or more, most preferably the entirety, of the whole reaction time from time of beginning polymerization to time of completion of polymerization. At a time when the temperature is not boiling point, the polymerization temperature is preferably in the neighborhood of boiling point of the reaction solution, more preferably in the range of 80° C. or more at least. In case where the polymerization temperature is in the range of less than 80° C., efficiency of the polymerization initiator as use becomes lower and there are disadvantages in that the amount of residual monomer in the obtained water-soluble polymer increases. Temperature control becomes very easy by carrying out polymerization at boiling point. Therefore, there are advantages in that quality of the obtained polymer becomes very stable.

The temperature when pH or concentration is adjusted at time of initial charging and after completion of polymerization, is not especially limited and can be settled appropriately.

<Polymerization Concentration>

Polymerization concentration is not especially limited, but can be settled appropriately if necessary, and is preferably in the range of 35 to 75 weight %, more preferably 40 to 70 weight % at time of initial charging. In case where the concentration is lower than 35 weight %, reactivity of the unsaturated dicarboxylic acid monomer becomes much lower. In case where the concentration is higher than 75 weight %, the reaction solution becomes slurry because of losing water-solubility of the monomer, a precipitate is caused, and it is impossible to carry out homogeneous polymerization. Polymerization concentration after completion of polymerization is preferably in the range of 35 to 65 weight %, more preferably 40 to 60 weight %. Concentration of additives is adjusted according to the above polymerization concentration. In case where the concentration after completion of polymerization is lower than 35 weight %, as a result, monomer concentration during the polymerization becomes very low, reactivity thereof becomes low, and the amount of residual monomer in the obtained water-soluble polymer is apt to increase. In case where the concentration is higher than 65 weight %, the reaction solution becomes very viscous, it is impossible to carry out homogeneous polymerization. In addition, there are disadvantages in handling.

<Polymerization Pressure>

Polymerization pressure is not especially limited, and may be either ordinary pressure (atmospheric pressure), compressed pressure, or reduced pressure.

<Weight-average Molecular Weight of Polymer>

In the present invention, a polymer having an in tended weight-average molecular weight can be obtained, but the production process and the production apparatus according to the present invention is particularly suitable to obtain a polymer having a weight-average molecular weight of 500 to 2,000,000, preferably 1,000 to 1,000,000.

<Amount of Residual Monomer>

In the present invention, the amount of residual monomer in the obtained water-soluble polymer can be decreased very much, 5000 ppm or less in terms of substantial amount, 4000 ppm in the preferred embodiments.

Production Apparatus production apparatus for producing a polymer, according to the present invention, comprises a reactor in order to produce the polymer, a stirrer in order to stir a reaction solution in the reactor, and a condenser so that a vaporized reaction solution can be cooled and returned to the reactor, and further comprises a vapor velocity measuring means of monitoring a vapor velocity in the condenser, and an vapor velocity adjusting means of adjusting the vapor velocity.

The vapor velocity measuring means is not especially limited, but preferably examples thereof include a method which comprises: placing a flowmeter in order to measure a reflux amount of a reaction solution that is cooled with the condenser and returned to the reactor, for example, in a returning flow pass from the condenser to the reactor; estimating the reflux amount with the flowmeter; and calculate the vapor liner rate by the above-mentioned calculating formula.

The vapor velocity adjusting means is not especially limited, but for example, as above mentioned as the method for adjusting the vapor velocity, examples thereof include placing a jacket in order to let cooling water or steam flow at a side portion of the reactor.

In addition, as other method for adjusting the vapor velocity, a method comprising adjusting cooling ability of the condenser is effective. Examples of the form of the condenser generally include: a type that a cooling tube or a cooling coil in which refrigerant flows passes through flow pass of the condenser, and a type that circumference of flow pass of the condenser is covered with a cooling jacket in which refrigerant flows. However, at this time, the cooling ability of the condenser can be adjusted by changing flow amount or temperature of the refrigerant. In addition, beforehand, the cooling ability can be improved by changing structure of the condenser, so that contact area of vapor flowing in the flow pass of the condenser, and the above cooling tube, the cooling coil or the jacket, may enlarge. In addition, kinds of the refrigerant are not especially limited, but for example, water and alcohol (concretely, such as ethanol) can be used.

An example of embodiment of the production apparatus for producing a polymer, according to the present invention is illustrated in sectional view of FIG. 1. In FIG. 1, a reactor 1 comprises a stirrer 2 in the reactor in order to stir a reaction solution by rotating a rod having a paddle at an end. In addition, flow pass 4 running to condenser 3 is placed above the reactor 1. Coil 5 in which refrigerant flows passes in flow pass of the condenser 3. Accordingly, a vaporized reaction solution is cooled and condensed again. And the condensed reaction solution is returned to the reactor 1 from the condenser 3 through flow pass 6. This flow pass 6 is connected to the flow pass 4 near upper portion of the reactor 1 and a flowmeter 7 in order to measure a reflux amount is placed on the way of the flow pass 6. In addition, a vent line 8 in order to adjust inner pressure of the production apparatus to atmospheric pressure is placed near a lower portion of the condenser 3, that is to say, in the neighborhood of an exit connected to the flow pass 6. Furthermore, a lower jacket 9 in order for steam to flow is placed around the reactor 1, in detail, outside from a bottom to lower side portion, and a upper jacket 10 in order for cooling water to flow is placed around the reactor 1, in detail, outside from a neighborhood of a middle side portion to upper side portion. The reflux amount, namely, the above-mentioned vapor velocity is controlled by adjusting a flow amount of steam which flows in the lower jacket 9 or cooling water which flows in the upper jacket 10.

(Effects and Advantages of the Invention):

The production process for a polymer and the production apparatus therefor according to the present invention, enables to suppress foaming efficiency. Therefore, hitherto, a process that cannot be enlarged to a scale for a practical apparatus by causing extreme foaming in the same production process as that in laboratory scale, can be enlarged to leave the production process in laboratory sale as it is. Then, a polymer having the same quality as that obtained in a laboratory level, can be obtained. Therefore, the polymer of which components and molecular weight was adjusted and developed in accordance with various use in laboratory scale, can be synthesized productively and reproducibly.

As to concrete use of the production process for a polymer and the production apparatus therefor according to the present invention, example thereof include: for example, inorganic pigment dispersants, scale inhibitors, chelating agents, detergent compositions, fiber-treating agents, wood pulp-bleaching assistants.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. Incidentally, the unit "%" denotes "weight %".

Hereupon, measuring methods for the weight-average molecular weight of the obtained polymer and the amount of residual monomer in this polymer are illustrated at first.

<Measuring Method for Weight-average Molecular Weight (hereinafter, "Mw" for short)>

As measured by GPC (gel permeation chromatography).

Column: G3000PWXL (made by TOSOH Corporation) if Mw is 20,000 or less.

Column: GF-7MHQ (made by SHOWA DENKO) if Mw is more than 20,000.

Column temperature: 35° C.

Moving phase: an aqueous solution as prepared by adding pure water to 34.5 g of disodium hydrogenphosphate dodecahydrate and 46.2 g of sodium dihydrogenphosphate dihydrate (both of which are special grade reagents; hereinafter, the reagents as used for measurement are all special-grade ones) to adjust the entirety to 5,000 g, and then filtering the resultant mixture through a membrane filter of 0.45 μm.

Flow rate: 0.5 ml/min.

Detector: UV 214 nm

Calibration curve: sodium polyacrylate standard sample (made by Sowa Kagaku Co.).

<Measuring Method for Amount of Residual Monomer>

As measured by GPC.

Column: G3000PWXL (made by TOSOH Corporation).

Column temperature: 35° C.

Moving phase: 0.1% aqueous phosphoric acid solution filtrated through 0.45 micron membrane filter.

Flow rate: 1.0 ml/min.

Detector: UV 200 nm.

Calibration curves: as prepared by use of the below-mentioned standard sample having the same composition as used in examples.

Acrylic acid: 80% aqueous acrylic acid solution.

Maleic acid: maleic anhydride.

In addition, as to all the monomer, the amounts of residual monomers were denoted as a solid content in terms of sodium salts.

Hereinafter, at first, in order to demonstrate that a production process and a production apparatus therefor, according to the present invention, are effective in practical scale, polymerization in 5 kg or less scale of laboratory level were carried out, and the weight-average molecular weight of the obtained polymer and the amount of residual monomer in this polymer were confirmed. Then, these are illustrated as referential examples. Thereafter, examples and comparative examples that: have the same polymerization prescription as the referential examples have, and are enlarged in 1 t or more scale, were illustrated. Furthermore, in the examples, a vapor velocity was calculated, from a reflux amount measured with the flowmeter placed in flow pass returned from the condenser to the reactor, and by the aforementioned calculation method.

REFERENTIAL EXAMPLE 1

An acrylic acid homopolymer having Mw of 6,000 was produced by use of a SUS-made separable reactor of five liters in capacity as fitted with a reflux condenser and a stirrer.

First of all, 614.6 g of ion-exchanged water was charged into the reactor and the water was heated to boiling point thereof. Under stirring with maintaining boiling point refluxing state, next, 1622.2 g of 80% aqueous acrylic acid solution (hereinafter, denoted to "80% AA") over a period of 150 minutes, 85.8 g of 15% aqueous sodium persulfate solution (hereinafter, denoted to "15% NaPS") over a period of 170 minute, and 152.8 g of 45% aqueous sodium hypophosphite solution over a period of 170 minute, began to be dropped at the same time, with a substantially constant dropping rate, from different dropping inlets respectively. After the dropping end of all components, the boiling point refluxing state was maintained for further 10 minutes to complete the polymerization. In addition, a problem of foaming was not caused during the polymerization in particular.

A polymer of Referential Example 1 was obtained as stated above. As a result of measurement, the obtained polymer had Mw of 6,000 and the amount of residual acrylic acid was 40 ppm.

EXAMPLE 1

An acrylic acid homopolymer having Mw of 6,000 was produced in 5 t scale in the same way as of Referential Example 1 except that a reactor fitted with a jacket in which steam flows in order to maintain boiling point at a side portion thereof, and a cooling condenser in order to cool vapor generated during the reaction and to return to the reaction system at a upper side thereof was used, and charging amounts were enlarged 1000 times more than that of Referential Example 1.

In addition, the amount of the steam in the jacket was adjusted, so that the vapor velocity can be 0.030 m/s (Mw of the intended polymer was 6,000, and the common logarithm value of Mw multiplied by the vapor velocity was 0.113) by checking foaming state and a reflux amount during the polymerization period.

A polymer of Example 1 was obtained as stated above. As a result of measurement, the obtained polymer has Mw of 6,000 and the amount of residual acrylic acid is 60 ppm.

COMPARATIVE EXAMPLE 1

A procedure was carried out in the same way as of Example 1 except that the steam amount added to the jacket was maintained constant at all times from time of raising temperature initially, namely, that the amount of the added steam was not adjusted by checking foaming state and a reflux amount. As the result, very extreme foaming was caused after 110 minutes from the beginning of the polymerization and it became impossible to continue the polymerization. The vapor velocity at the time was beyond 0.060 m/s. For reference, Mw of the obtained polymer was 6,000 as a result of sampling analysis of the reaction solution. Therefore, the common logarithm value of Mw multiplied by the vapor velocity was beyond 0.227.

REFERENTIAL EXAMPLE 2

A maleic acid-acrylic acid copolymer having Mw of 50,000 was produced by use of the same apparatus as of Referential Example 1.

First of all, 320 g of ion-exchanged water and 966 g of 48% sodium hydroxide solution were initially charged into the reactor and 568 g of melting maleic anhydride was added under stirring. The, under stirring with maintaining boiling point refluxing state, next, 888 g of 80% AA over a period of 120 minutes, 20.4 g of 35% hydrogen peroxide solution over a period of 150 minutes, 121.4 g of 15% NaPS over a period of 150 minute, and 700 g of ion-exchanged water over a period of 150 minute, began to be dropped at the same time, with a substantially constant dropping rate, from different dropping inlets respectively. After the dropping end of all components, the boiling point refluxing state was maintained for further 30 minutes to complete the polymerization. In addition, a problem of foaming was not caused during the polymerization in particular.

A polymer of Referential Example 2 was obtained as stated above. As a result of measurement, the obtained polymer had Mw of 50,000, the amount of residual maleic acid was 2900 ppm, the amount of residual acrylic acid was 80 ppm, and the total amount of residual monomers was less than 3000 ppm.

EXAMPLE 2

A maleic acid-acrylic acid copolymer having Mw of 50,000 was produced in 18 t scale in the same way as of Referential Example 2 except that a reactor as fitted with a separated jacket at a side portion thereof which comprises a lower jacket in which steam flows in order to maintain boiling point, and an upper jacket in which cooling water flows if necessary, in order to remove heat with checking a reflux amount; and a cooling condenser in order to cool vapor generated during the reaction and to return to the reaction system at a upper side thereof was used, and charging amounts were enlarged 5000 times more than that of Referential Example 2.

In addition, the amounts of the steam in the lower jacket and the cooling water in the upper jacket were adjusted, so that the vapor velocity can be 0.021 m/s (Mw of the intended polymer was 50,000, and the common logarithm value of Mw multiplied by the vapor velocity was 0.099) by checking foaming state and a reflux amount during the polymerization period.

A polymer of Example 2 was obtained as stated above. As a result of measurement, the obtained polymer had Mw of 50,000, the amount of residual maleic acid was 1600 ppm, the amount of residual acrylic acid was 40 ppm, and the total amount of residual monomers was less than 1700 ppm.

COMPARATIVE EXAMPLE 2

A procedure was carried out in the same way as of Example 2 except that the cooling water did not flow in the upper jacket, heat was almost removed entirely by the condenser only, and the steam amount added to the jacket was maintained constant at all times from time of raising temperature initially. As the result, very extreme foaming was caused after 90 minutes from the beginning of the polymerization and it became impossible to continue the polymerization. The vapor velocity at the time was 0.034 m/s. For reference, Mw of the obtained polymer was 45,000 as a result of sampling analysis of the reaction solution. Therefore, the common logarithm value of Mw multiplied by the vapor velocity was beyond 0.158.

REFERENTIAL EXAMPLE 3

An acrylic acid homopolymer having Mw of 800,000 was produced by use of the same apparatus as of Referential Example 1.

First of all, 600 g of ion-exchanged water was charged into the reactor initially and the water was heated to boiling point thereof. Under stirring with maintaining boiling point refluxing state, next, 1400 g of 30% aqueous acrylic acid solution over a period of 60 minutes and 25 g of azo compound initiator (made by Wako Pure Chemical Industries, Ltd., commercial name: V-50) over a period of 80 minute began to be dropped at the same time, with a substantially constant dropping rate, from different dropping inlets respectively. After the dropping end of all components, the boiling point refluxing state was maintained for further 20 minutes to complete the polymerization. In addition, a problem of foaming was not caused during the polymerization in particular.

A polymer of Referential Example 3 was obtained as stated above. As a result of measurement, the obtained polymer had Mw of 800,000, and the amount of residual acrylic acid was 100 ppm.

EXAMPLE 3

An acrylic acid homopolymer having Mw of 800,000 was produced by use of the same apparatus as of Example 2 and in 2 t scale in the same way as of Referential Example 3 except that charging amounts were enlarged 1000 times more than that of Referential Example 3.

In addition, the amounts of the steam in the lower jacket and the cooling water in the upper jacket were adjusted, so that the vapor velocity can be 0.009 m/s (the common logarithm value of Mw of the intended polymer was 800,000, and the Mw multiplied by the vapor velocity was 0.053) by checking foaming state and a reflux amount during the polymerization period.

A polymer of Example 3 was obtained as stated above. As a result of measurement, the obtained polymer had Mw of 800,000, and the amount of residual acrylic acid was 120 ppm.

COMPARATIVE EXAMPLE 3

A procedure was carried out in the same way as of Example 3 except that the concentration of the acrylic acid solution was changed from 30% to 45% and 933 g of 45% acrylic acid solution was used. As the result, the solution was much more viscous because the highly concentrated solution was used and it became impossible to continue the polymerization after 40 minutes. The vapor velocity at the time was 0.026 m/s. For reference, Mw of the obtained polymer was 1,200,000 as a result of sampling analysis of the reaction solution. Therefore, the common logarithm value of Mw multiplied by the vapor velocity was beyond 0.158.

As stated above, if the vapor liner rate was not controlled, extreme foaming was caused because lowering an ability for removing heat greatly and it became impossible to continue the polymerization. However it was understandable that foaming can be suppressed effectively by controlling the vapor velocity to be a value calculated from Mw of the intended polymer during the reaction, and the polymer can be produced effectively.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a polymer, which comprises the steps of: refluxing and cooling a vapor generated in a reaction, and returning the vapor to the reaction system in order to produce the polymer, wherein the vapor velocity is adjusted in the range of 0.001 to 0.05 m/s so that a common logarithm value of a weight-average molecular weight of the polymer that is finally intended to obtain multiplied by the value of the vapor velocity can be not more than 0.15 for not less than 10% of the whole reaction time.

* * * * *